FIG. 1.

INVENTOR.
CLYDE H. O. BERG,
BY
AGENT.

Aug. 4, 1953  C. H. O. BERG  2,647,587
APPARATUS FOR SOLIDS FLOW CONTROL
Filed June 8, 1951  3 Sheets-Sheet 2

INVENTOR.
CLYDE H. O. BERG,
BY

AGENT.

Aug. 4, 1953 C. H. O. BERG 2,647,587
APPARATUS FOR SOLIDS FLOW CONTROL
Filed June 8, 1951 3 Sheets-Sheet 3

INVENTOR.
CLYDE H. O. BERG,
BY
AGENT.

Patented Aug. 4, 1953

2,647,587

UNITED STATES PATENT OFFICE 2,647,587

APPARATUS FOR SOLIDS FLOW CONTROL

Clyde H. O. Berg, Long Beach, Calif., assignor to Union Oil Company of California, Los Angeles, Calif., a corporation of California Application June 8, 1951, Serial No. 230,609

20 Claims. (Cl. 183—4.2)

This invention relates to the handling of powdered or granular solids and in particular to an improved method and apparatus for maintaining a constant flow rate and a uniform rate of solids removal throughout the cross-sectional area of a treating or contacting column or other apparatus through which granular solids are passed.

The movement and recirculation of granular or powdered solid materials is of great industrial importance in a considerable number of operations. Foremost among these are those processes in which granular solids such as adsorbents or catalysts are passed through a treating column in which a fluid, gaseous or liquid, is also passed to contact the solid material. In these operations particularly a constant flow rate of granular solids is essential to adequate control of the operation. Equally essential is the control of the rate of solids flow through any given part of the cross-sectional area of the column. It is most desirable that a uniform flow of granular solids be maintained throughout the entire cross-sectional area. Failure to maintain such uniform flow has very adverse effects in such contacting processes as contact coking, catalytic cracking and other hydrocarbon conversion processes involving a catalyst, the other well-known catalytic processes such as Fischer-Tropsch synthesis and any other fluid-solids contact processes. Continuous ion exchange operations involving contact of liquids with the solid ion exchange resins and like materials are benefited by this invention. The attempt to withdraw granular solids from such contacting vessels by means of a conical draw-off section connecting the bottom of a large diameter column with a relatively small diameter outlet generates solids flow effects which may be reflected completely through the height of the contacting column as a non-uniform flow pattern, for example the center portion of the solids bed may flow downwardly from 10 to as much as 500 per cent faster than the material adjacent the walls of the column. In operations where solids flow control is critical, as in those operations mentioned above, this results in non-uniform utilization of the catalyst or adsorbent, insufficient contacting of the fluid passed in contact with the solid material and in many cases prevents the process from being continued over desirably long lengths of time.

The present invention is therefore directed to an improved process and apparatus which will permit the establishment and maintenance of uniform granular solids flow throughout the cross-sectional area of such contacting columns. Such a method and apparatus for solids control is well adapted to the various well-known fluid-solids contacting processes in which uniform solids flow is to be maintained.

It is therefore a primary object of this invention to provide a process and apparatus for achieving the above-named results.

It is another object of this invention to provide an improved granular solids feeding device for metering the volumetric flow of granular solids and which, while capable of maintaining uniform rates of solids flow, is substantially unaffected by the passage of fluids in either direction through the feeding device.

A more specific object of this invention is to provide a granular solids feeding device having substantially the same cross-sectional area as the column in which it is employed and which is characterized by providing substantially constant throughput of granular solids through each incremental portion of cross-sectional area of the feeding device.

A more specific object of this invention is to provide such a solids feeding device which exerts substantially no resistance to the flow of fluids through the feeding device in either direction simultaneously with the flow of granular solids.

Other objects and advantages of the present invention will become apparent to those skilled in the art as the description thereof proceeds.

Briefly, the present invention comprises a granular solids feeding device consisting essentially of three trays disposed parallel to and spaced apart from each other and transverse to the solids flow direction and having substantially the same cross-sectional area as that of the conduit, column or tower through which solids pass. The upper tray is stationary and peripherally supported at the wall of the column and is provided with a plurality of converging dependent feeder tubes through which the granular solids flow from above the tray. These feeder tubes are arranged in a regular geometric pattern.

Positioned immediately below the lower openings of the feeder tubes is a central or movable tray containing another plurality of dependent charge tubes, each of which has substantially the same cross-sectional area as one of the feeder tubes dependent from the upper tray. The geometric arrangement of the dependent tubes from the movable tray may be, in one modification, exactly the same arrangement, though reduced in scale, as is employed on the upper tray. A separate reciprocating means is provided to transversely reciprocate the movable tray with respect to the stationary trays above and below it, thereby alternately bringing the charge tubes of the reciprocating tray into and out of alignment with the feeder tubes dependent from the upper tray.

Positioned immediately below the outlet openings of the charge tubes is a lower stationary tray peripherally supported at the wall of said column and provided with a plurality of openings therethrough, part of which openings are established thereon, in one modification, in the same geometric pattern as that employed in the reciprocating tray, the pattern being laterally displaced with respect to the pattern on the upper tray, i. e., these openings are arranged so that the reciprocating tray charge tubes may be brought alternately into and out of alignment with the feeder tubes of the upper tray and then with the holes in the lower tray upon reciprocation of the movable tray. Thus, any given charge tube of the reciprocating tray is first brought into alignment with a corresponding feeder tube depending from the upper stationary tray and therefrom receives a full charge of granular solids. This charge of granular solids is prevented from flowing through the charge tube due to the lateral displacement mentioned above whereby this tube is not aligned with an opening in the lower tray at the time it is aligned with the lower opening of a feeder tube depending from the upper stationary tray. Upon reciprocation of the movable tray, a particular charge tube is brought into alignment with an opening in the lower tray while the lower opening of the corresponding feeder tube is misaligned, preventing further solids flow therefrom. This misalignment presents a flat, unperforated surface of the reciprocable or lower stationary tray to the lower opening of the feeder or charge tubes respectively thus sealing it and preventing solids flow. The charge of solids passes through the opening in the lower tray and upon further reciprocation this particular tube is realigned with the upper tube to receive an additional charge of solids. Other modifications of charge and feeder tube arrangement which permit double charging of the charge tubes on each cycle are given below.

By slow reciprocation of the movable tray at velocities of from as low as 0.1 to as high as 15 cycles per minute, granular solids are discharged from the upper or feeder tubes into the charge tubes dependent from the moving tray and are subsequently discharged therefrom through the openings of the lower tray. The speed with which the moving tray is reciprocated and the total volume of the charge tubes directly control the net flow rate of granular solids through the feeder.

Positioned below the lower tray is a gridwork or screen through which the discharged solids pass and which serves to retain any miscellaneous foreign solid materials having a size which is great enough to interfere with subsequent operations and yet which will permit the substantially uninterrupted passage of the granular solids desirably transferred and also does not impede the passage of fluids flowing in either direction. Preferably the mesh size of this screen is at least 5 times the average particle diameter.

With regard to fluid flow through the solids feeder of the present invention, two important steps are taken. The first is the establishment of a plurality of fluid riser tubes opening through and extending upwardly from the upper tray and provided with caps which prevent the downward flow therethrough of granular solids. These risers and caps are arranged in a regular geometric pattern and dispersed in rows between the upper openings of the feeder tubes depending from the upper tray. It has been found that substantially no resistance to fluid flow through the upper tray is thus presented. Consequently, any fluid flow through the upper tray does not pass through the feeder tubes through which the granular solids flow and separate solids and fluid paths through the upper tray are hereby established. The second step is the incorporation in the lower tray of a plurality of excess apertures which, during reciprocation of the moving tray, are never brought into alignment with the dependent charge tubes of the movable tray. Thus the openings in the third or lower tray include those through which granular solids are discharged and those through which granular solids are never discharged but which provide a low resistance opening for fluids through the lower tray.

The steps taken to minimize the pressure drop caused by flow of fluids through the solids feeding device of this invention are of extreme importance since in most instances the feeding device is employed for the metering of granular solids in situations where it is desirable or necessary for fluid flow to exist through the feeding device. By the method and apparatus of the present invention a given rate of reciprocation of the movable tray will establish a certain granular solids flow rate regardless of changes in fluid flow or pressure drop across the feeding device. This desirable property makes this device applicable in a great many of solids fluid contacting operations in which the various star feeders and orifice-type solids flow devices become inoperable.

The dependent tubes from the upper or stationary tray preferably converge, that is, have inlet openings distributed in a regular geometric pattern throughout substantially the entire cross-sectional area of the upper tray and have their outlet openings disposed in substantially the same geometric pattern but in which this pattern is reduced in size. Restated, the inlet and outlet openings of these tubes are arranged in substantially the same geometric pattern but the tubes converge so that the outlet opening of each such tube is spaced at a smaller radial distance from the vertical axis of the feeding device than is the upper inlet opening of the tube. This feature is of extreme importance in that a smaller moving tray (relative to the upper tray) may be utilized within the column providing for the placement of feeder tubes very close to the column wall thereby materially improving the uniform withdrawal characteristics of the device.

The arrangement of the charge tubes dependent from the reciprocating central tray may be arranged in a variety of ways. First, the charge tubes may be arranged to receive granular solids from each extremity of the travel of the reciprocating tray and from different feeding tubes dependent from the upper tray. The discharge of each of these charges of granular solids then takes place at a central position of the reciprocating tray when the charge tube is aligned with an opening in the lower tray. Second, the charge tubes may be arranged to receive solids at a central position and discharge them at each extreme of the tray travel. Thus in both these modifications with each cycle of moving tray reciprocation each charge tube receives and discharges two of its own volumes of granular solids. Increased solids flow rates are permitted for a given reciprocation rate and the distance of tray travel is somewhat larger than that of the following modification.

Third, the charge tubes may be arranged to receive a charge of solids at one extreme position of the reciprocation and to discharge granular solids from the opposite extreme position. Since the charge tubes are preferably arranged in rows across the expanse of the reciprocating tray, alternate rows may be made to receive solids at one extreme position while the remaining rows receive solids at the other extreme position. The tubes in such rows are discharging their granular solids while alternate tube rows are filling. The displacement of the moving tray in this modification is approximately one-half that of the foregoing modification. Fourth, the alternate rows of charge tubes may be arranged to operate according to the first and second modifications described above.

Preferably the tubes are flattened into a semi-elliptical shape in which the minimum diameter of the tubes is at least three times and preferably about ten times the maximum diameter of the granular solids being handled. The granular solids which may be handled by the feeding device of this invention vary from as small as 100 mesh or finer as examples of powdered materials to as high as 2 inches in diameter or larger as examples of crushed materials. The minor tube dimension is at least five times the average solids particle diameter. The clearance which is maintained between the lower openings of the feed tubes and the openings of the reciprocating tray and the clearance between the lower openings of the charge tubes and the perforated tray is at least 1.5 times the average diameter of the granular solids being handled and preferably between two and five times this diameter. If these size limitations are observed, the motion of the reciprocating tray is smooth and attrition of granular solids passing through the feeder is reduced to a minimum. Such considerations are of extreme importance in recirculatory processes in which expensive catalysts and adsorbents are conveyed.

As stated above, the feeding device of the present invention is applicable to any process and apparatus in which the maintenance of uniform flow over a cross-sectional area or a column is required and, at the same time, presenting substantially no resistance to a simultaneous flow of fluid in any direction through the feeding zone. The feeding device may be employed in contact coking processes, catalytic hydrocarbon cracking, reforming, desulfurization and other catalytic conversion processes, to continuous selective adsorption for the separation of gaseous mixtures on solid granular adsorbents and to the continuous adsorptive or other treatment of liquids such as is employed in the clay treating of lubricating oil fractions and the like.

As an example of the application of this invention, reference is directed to the accompanying drawings in which the feeding device of the present invention is shown as applied to a continuous selective adsorption process for the separation of gaseous mixtures.

Figure 1:
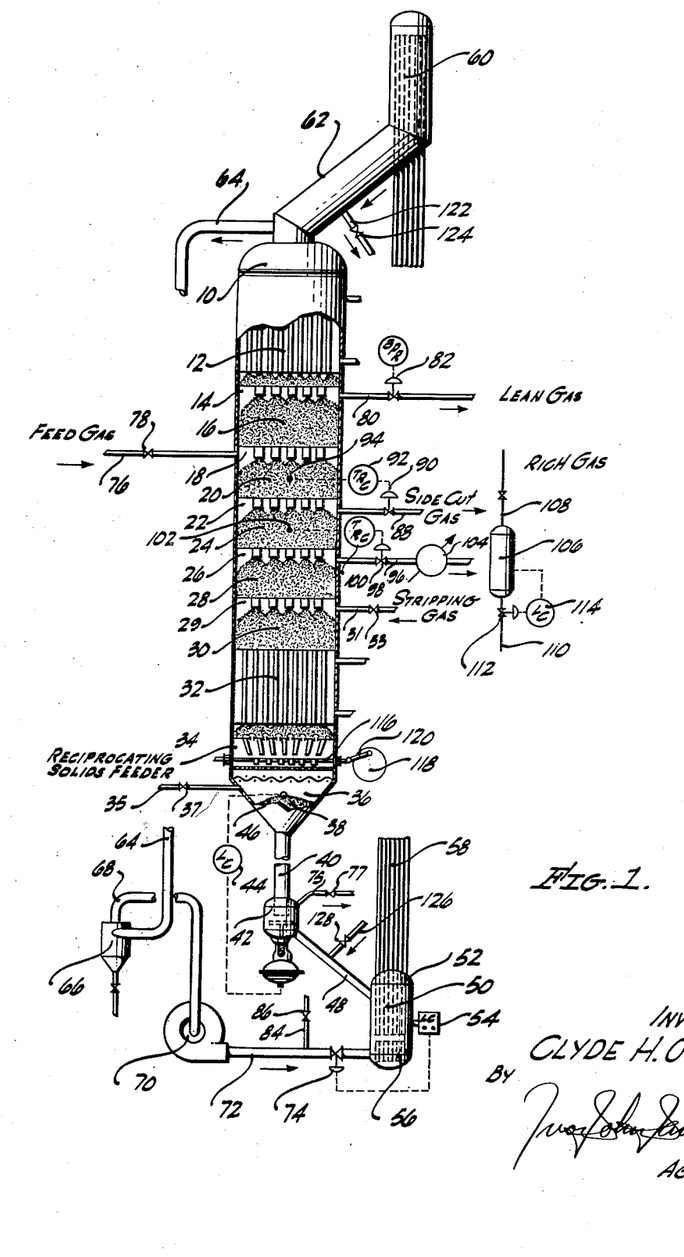
Figure 1, which is an elevation view in partial cross-section of a selective adsorption column employing a recirculatory adsorbent flow in which the reciprocating solids feeder of the present invention is employed.

Referring now more particularly to Figure 1, selective adsorption column 10 is provided therein at successively lower levels with tubular cooling section 12, lean gas disengaging zone 14, adsorption zone 16, feed gas engaging zone 18, primary rectification zone 20, side cut disengaging zone 22, secondary rectification zone 24, rich gas product disengaging zone 26, preferential desorption zone 28, concurrent stripping zone 30, heating zone 32, and the reciprocating solids feeder 34. Granular adsorbent introduced into the tube of column 10 passes downwardly successively through the aforementioned zones as a compact moving bed. Granular solids discharged from the solids feeder pass into bottom zone 36 forming accumulation 38. The adsorbent passes through sealing leg 40 into vent gas removal and solids flow control zone 42 which operates in conjunction with level controller 44 and maintains a predetermined level 46 of granular adsorbent in bottom zone 36. Granular adsorbent flows via transfer line 48 into solids inlet zone 50 of induction chamber 52. Level controller 54 detects the solids level maintained in inlet zone 50 and controls the rate of flow of lift gas passing into lift gas inlet zone 56. A suspension of granular adsorbent in lift gases forms which is passed through the plurality of parallel conveyance lines 58 and is introduced into separator zone 60 in which the suspension is broken. The conveyed solids and lift gas subsequently pass as independent phases through transfer line 62 for re-introduction into the top of selective adsorption column 10. The lift gas is removed via line 64 and is passed through cyclone 66 for the separation of adsorbent fines. The fines-free lift gas is subsequently passed via line 68 under the influence of blower 70 through line 72 at a rate controlled by valve 74 into lift gas inlet zone 56 to convey further quantities of adsorbent.

The gaseous mixture to be separated is introduced via line 76 at a rate controlled by valve 78 into feed gas engaging zone 18. The gaseous mixture passes upwardly countercurrent to the downwardly flowing adsorbent in adsorption zone 16. The more readily adsorbable constituents are adsorbed on the adsorbent therein forming a rich adsorbent leaving a less readily adsorbable constituent as a substantially unadsorbed lean gas. At least part of this unadsorbed lean gas is removed from lean gas disengaging zone 14 via line 80 at a rate controlled by back pressure regulator 82 serving to maintain the adsorption column pressure. The rest of the unadsorbed lean gas passes upwardly through the tubes of cooling zone 12 in direct countercurrent contact with the downwardly flowing adsorbent serving to desorb residual quantities of stripping gas therefrom and to presaturate the adsorbent with the lean gas constituents while dissipating the heat of adsorption thereof. This flow of purge gas is subsequently combined with the recirculating flow of lift gas from which an amount equivalent to the purge gas flow is removed via line 84 at a rate controlled by valve 86.

The rich adsorbent passes into primary rectification zone 20 wherein it is contacted by a countercurrent flow of constituents of intermediate adsorbability as a reflux. Traces of adsorbed less readily adsorbable constituents are preferentially desorbed from the rich adsorbent forming a partially rectified adsorbent. The reflux gas is preferentially adsorbed and flows downwardly with the adsorbent. The desorbed constituents pass upwardly and are combined with the unadsorbed lean gas stream.

The partially rectified adsorbent is countercurrently contacted in secondary rectification zone 24 with a reflux of the more readily adsorbable constituents, thereby preferentially desorbing the constituents of intermediate adsorbability forming a rectified adsorbent. The desorbed constituents are partly removed from side cut gas disengaging zone 22 via line 88 at a rate controlled by valve 90 in accordance with temperature recorder controller 92 and thermocouple point 94. The rest of the constituents of intermediate adsorbability pass through primary rectification zone 20 as reflux to maintain therein a predetermined adsorbent temperature detected by thermocouple point 94. The adsorption of more readily adsorbable constituents on an adsorbent releases the heat of adsorption and raises the adsorbent temperature. Thus the reflux employed generates a temperature gradient in each rectification zone which is employed as described to control reflux and product gas flows.

The rectified adsorbent flows into preferential desorption zone 28 wherein it is contacted with a countercurrent stream of stripping gas such as steam introduced via line 31 controlled by valve 33 or via line 35 controlled by valve 37 as described in greater detail below. At the temperature and pressure existing within zone 28, the stripping gas is preferentially adsorbed. The more readily adsorbable constituents are hereby preferentially desorbed and parts thereof are removed via line 96 at a rate controlled by valve 98 in accordance with temperature recorder controller 100 in response to thermocouple point 102. This stream of more readily adsorbable constituents is passed through rich gas cooler 104 and is introduced into separator 106 wherefrom product rich gas is removed via line 108 and any condensate (such as stripping steam condensate) is removed via line 110 at a rate controlled by valve 112 in accordance with liquid level controller 114. The rest of the desorbed rich gas passes into secondary rectification zone 24 to maintain a predetermined adsorbent temperature therein as a reflux gas.

A portion of the stripping gas introduced via line 31 at a rate controlled by valve 33 passes downwardly through zones 30, 32, 34, through the reciprocating solids feeder and sealing leg 40 into solids flow control zone 42. A portion of the lift gas passes upwardly through transfer line 48 into flow control zone 42. A seal gas mixture of stripping gas and lift gas is removed via line 75 at a rate controlled by valve 77. In this type of operation therefore a downward flow of gas through the solids feeder zone exists which passes unobstructed through the feeding device by means of the risers and caps in the upper tray and through the vents of the lower tray. This downward flow of stripping gas exerts substantially no pressure drop across the solids feeding device as the flow of solids and gases are effectively separated. By this means no increase in solids discharge rate results due to the concurrent gas flow.

In another modification of this invention stripping gas may be introduced via line 35 at a rate controlled by valve 37 into bottom zone 36, wherefrom it flows countercurrently up through solids feeder 34, tubular heating zone 32, stripping zone 30 and preferential desorption zone 28. In this modification the entire quantity of stripping gas passes through the feeder zone by virtue of the gas risers and caps in the upper tray and the vent openings in the lower tray as well as the substantial clearances around the periphery of the movable tray, only a small pressure drop is exerted across the feeding device and no interference whatsoever with the down flow of adsorbent results.

The partially stripped adsorbent thus formed passes through stripping zone 30 into heating and desorption zone 32. In the latter zone the adsorbent is indirectly heated by condensing vapors or by flue gases to a temperature on the order of from 350° to 650° F. At these temperatures residual adsorbent materials are desorbed from the adsorbent, aided if desired by direct stripping gas contact, leaving a hot lean adsorbent.

The hot lean adsorbent subsequently flows through the reciprocating solids feeder 34 which serves to withdraw equal portions of granular adsorbent from all the incremental areas in the cross-sectional area of the column. Movable tray 116 reciprocates at a rate determined by driving means 118 which may comprise a rotating wheel provided with connecting rod 120 or which may comprise a fluid-actuated cylinder operated on a predetermined time cycle by means of pilot valves, etc. in the well-known ways. The granular adsorbent is recirculated as described above to contact further quantities of the gaseous mixture.

The uniform withdrawal of granular solids throughout the cross-sectional area of the column at a point below tubular heater 32 is reflected throughout the entire height of column 10 in a uniform downward flow of granular solids. By means of the engaging trays or zones shown (zones 14, 18, 22, 26 and 29) the introduction and removal of gases is also uniform across the entire cross-section of the column. Thus each quantity of gas introduced is contacted with a uniform quantity of granular adsorbent, each quantity of adsorbent passed through the individual zones is subjected to contact by a substantially constant velocity, equal volumes of gases to be treated and "channeling" is largely eliminated. Thus the composition of the gas at any cross-section within the column is substantially constant throughout its area thereby minimizing product gas contamination and establishing a high efficiency for adsorbent utilization.

With regard to stripping the adsorbent of its adsorbed materials, these constant flows of gas and solids insure complete desorption of all gases from every part of the adsorbent, thus rendering it possible to discharge active and uncontaminated adsorbent from the bottom of the column with a minimum desorption zone temperature and a minimum quantity of stripping steam.

Small quantities of contaminating materials may accumulate on the recirculating adsorbent. To remove such materials a small proportion of the recirculating adsorbent stream, for example between 5–20%, is removed from transfer line 62 via line 122 at a rate controlled by valve 124 and is passed through a separate reactivation zone not shown in which it is subjected to reactivating temperatures on the order of from 1000 to 2500° F. into contact with steam. The reactivated adsorbent is cooled and introduced via line 126 controlled by valve 128 into transfer line 48 for recirculation.

As an example of the foregoing selective adsorption operation, the feed gas comprises natural gas containing about 85% methane, 7% ethane, 4% propane, and 4% butane and higher molecular weight hydrocarbons. The lean gas contains 99%% methane with 0.5% ethane contamination. The side cut gas contains as high as 90–95% ethane with minor amounts of methane and propane contamination. The rich gas product contains 95–99% of the propane and higher molecular weight hydrocarbons present in the feed gas.

The granular adsorbents preferably include activated charcoal, activated carbons of other types, silica gel, activated alumina oxide and other well-known granular solid adsorbents for gases or liquids may be employed.

Although the foregoing example is directed to the selective adsorption of a gaseous mixture and fractionation of the gas into a plurality of fractions, it should be understood that this is by way of illustration only as the advantageous effects of the reciprocating solids feeder of this invention may be obtained when it is employed in any process in which granular solids are contacted with fluids either to effect chemical reactions in the fluids or in the solids, or when the granular solids are merely to be heated or cooled as in the contacting of granular heat transfer materials with flue gases or other heating agents.

Figure 2:
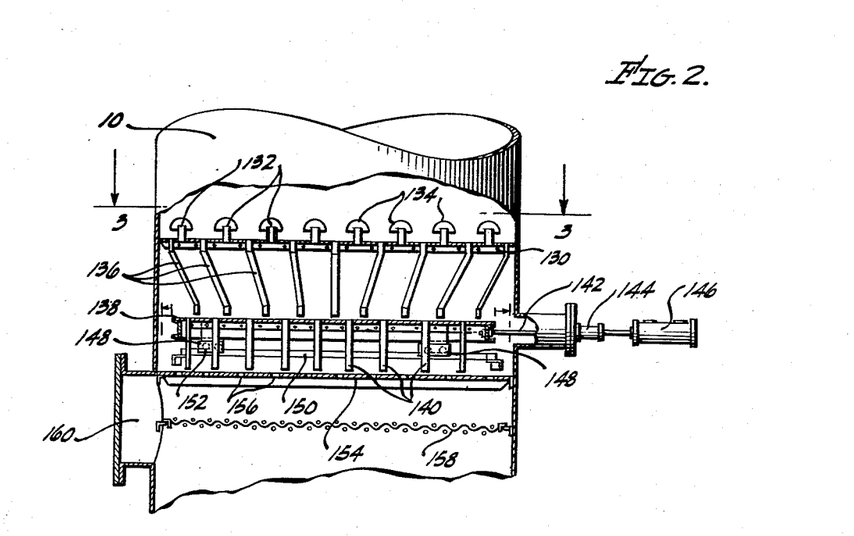
Figure 2, which is an elevation view in cross-section showing the details of one modification of the solids feeder.

Referring now more particularly to Figure 2, an enlarged elevation view in cross-section of the solids feeder device is shown. The upper tray 130 of the device provided with a plurality of gas risers 132, each provided with cap 134 covering the upper opening thereof and preventing the entry of granular solids. A plurality of dependent feeder tubes 136 is provided which converge somewhat from the regular geometric pattern in which their inlet openings are arranged on upper tray 130. The lower openings are arranged in substantially the same geometric pattern although reduced to between about 50% and 98% of the size of the pattern of the upper openings. The reduction in size of the pattern therefore approximates a decrease of from 2 to 50% in general radial displacement of the lower feeder tube openings from a vertical axis through the center of the upper tray.

Movable tray 138 is provided containing a plurality of dependent charge tubes 140. These tubes are straight and arranged in the same reduced scale geometric pattern as are the lower openings of feeder tubes 136 so the charge tubes may be aligned therewith. This tray is provided with drive shaft 142 connecting through shaft seal 144 with driving means 146, preferably comprising a fluid-actuated cylinder.

In this modification movable tray 138 is supported through carriages 148 on at least two lateral tracks 150 by means of rollers 152. The tracks are supported between the rows of dependent charge tubes and are attached at their ends to the walls of the column 10. Tray 138 is reciprocable, bringing the charge tubes into and out of alternate alignment with the outlet openings of feeder tubes 136 and the openings of the lower tray described below.

Disposed immediately below the outlet openings of charge tubes 140 is lower perforated tray 154. This tray is provided with a plurality of vent openings 155 (indicated more clearly in Figure 5) and discharge openings 156. The discharge openings 156 are arranged in a reduced scale geometric pattern and are aligned with the charge tubes only when the charge tubes are misaligned with the outlet openings of feeder tubes 136.

Both the upper stationary and the reciprocable trays are constructed preferably from channel irons held side by side with flanges down. The width and length of the channels of the reciprocable tray is preferably from 2% to 50% smaller than the length and width of the upper tray channels. This allows the centering of both feeder and charge tubes in rows along the channels and provides for the convergence of feeder tubes referred to above as well as the annular space for fluid flow around said tray.

The granular solids falling through the discharge openings pass through lateral screen 158 which is provided below the feeder to retain foreign solids particles of size sufficient to interfere with the flow of granular solids through subsequent portions of the apparatus. Manhole 160 is provided, opening into column 10 for the removal and inspection of screen 158 and the removal of any solid objects thus retained.

Figure 3:
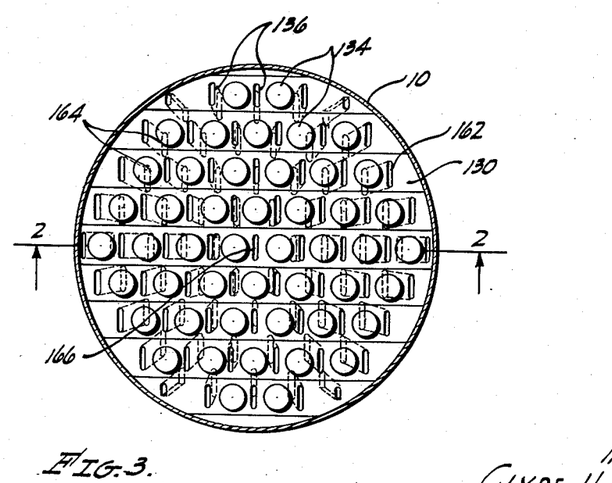
Figure 3, which shows a plan view of the upper or stationary tray of the solids feeder of this invention showing the risers and caps and the converging feed tubes.

With reference to Figure 3, a plan view of upper tray 130 is shown in which column 10 is indicated and in which caps 134 and feeder tubes 136 are also shown. At the center of the tray is a single feeder tube which is exactly aligned with the vertical axis passing through the center of the feeder. All of the other feeder tubes converge approximately towards this axis so that the inlet openings 162 of all the feeder tubes has substantially the same geometric pattern as the outlet openings 164 of the feeder tubes, the latter geometric pattern being reduced in scale to the extent of between 5 and 50% of the radial distance of each inlet 162 from the vertical axis of the feeder as represented by numeral 166.

Several "fractional" feeder tubes are also dependent from the upper stationary tray. These are fabricated from regular flattened elliptical feeder tubes and split longitudinally along the minor or major transverse axis and then a flat plate is welded across the cut edges to form a fractional tube having about one-half the flow area as the major portion of the feeder tubes used. Fractional charge tubes are also employed to correspond with the fractional feeder tubes. These fractional feeder tubes are disposed in the regular geometric (usually hexagonal) pattern referred to above around the periphery near the walls of the conduit or column through which solids are flowing. In the drawing two fractional tubes split along the major transverse axis are employed at either extreme of the middle tube row while four fractional tubes split along the minor axis are employed, one at each end of the extreme tube row. Operations have indicated that provision of such fractional tubes, particularly where the feeder has a hexagonal feeder tube pattern and is disposed in a conduit of circular cross-section, renders perfect the solids flow distribution in a bed above the upper stationary tray so that the solids flow at completely uniform velocities entirely throughout the cross-sectional area of the conduit above the feeder. This arrangement in combination with the fluid risers and caps on the upper tray, the reduced size of the intermediate tray providing a peripheral path for fluids to by-pass and the excess openings solely for gas flow in the lower tray hereby provides a device which provides perfectly uniform solids flow and in which fluid flow in either direction is ineffective in varying the uniformity of solids flow.

Figure 4:
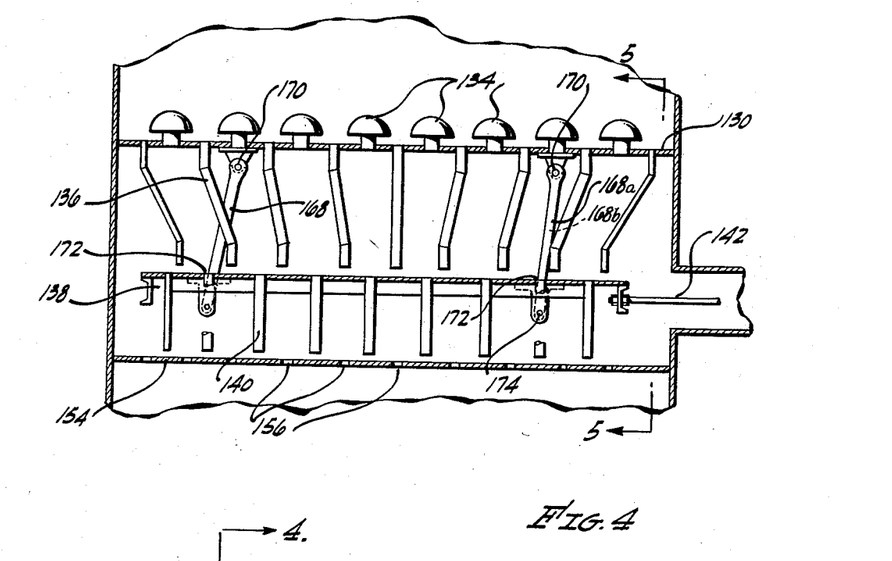
Figure 4, which shows an elevation view in cross-section of the details of a second modification of the solids feeder.

Referring more particularly to Figure 4, a modified form of the feeder shown in Figure 2 is shown here. Upper tray 130, movable tray 138, lower perforated tray 154, together with the associated feeder tubes 136 and charge tubes 140 are shown again. In this modification movable tray 138 does not reciprocate upon carriages riding along a horizontal track but is suspended by means of at least 3 hangers 168, 168a and 168b, the latter being directly behind 168a as Figure 4 is normally viewed. The upper extremity of each hanger 168 is pivoted by means of a bearing 170 which may be of the clevis and pin type but which is preferably a dust-tight lubricated spherical bearing. Hangers 168 pass from the upper suspension point 170 down through openings 172 maintained through movable tray 138. These hangers terminate at the lower suspension point 174 which again may be a clevis and pin type connection but is preferably a lubricated spherical enclosed bearing. In this modification movable tray 138 actually swings with respect to the upper tray and is reciprocated into and out of alternate alignment with the terminal openings of the feeder tubes 136 and with discharge openings 156 in lower tray 154.

In this modification the clearance between the terminal openings of the feeder tubes and the reciprocating tray and the clearance between the charge tubes and the lower tray vary during the cycle. In most cases hangers 168 may be made of the order of 20-30″ in length, thus minimizing the degree of change in these clearances. The minimum clearance which occurs between the movable tray and the feeder tubes at the extremities of the stroke and between the charge tubes and the lower at the center of the stroke is preferably maintained above the minimum values given previously.

Figure 5:
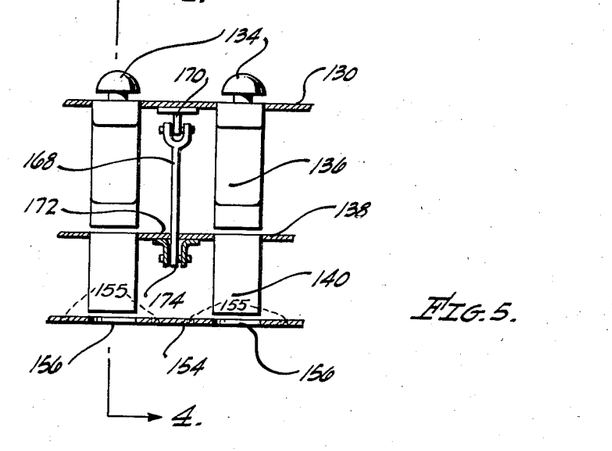
Figure 5 which indicates details of a preferred modification of the suspension means of the movable tray of the solids feeder.

In Figure 5 is shown an elevation view taken at right angles to the elevation view of Figure 4. The riser caps 134 are shown together with the flattened feeder tubes 136 and charge tubes 140. The purpose is discussed below. Upper extremity 170 and lower extremity 174 of hanger 168 is clearly shown, together with opening 172 maintained in the moving tray through which the hanger 168 extends.

Because of the change in clearance inherent in the swing type feeder shown in Figures 4 and 5 and to minimize attrition of granular solids passing through the feeding device, it is desirable to maintain the stroke or the distance through which the movable tray reciprocates at a minimum. Therefore it is highly beneficial to employ feeder and charge tubes having a non-circular cross-sectional area. Preferably the ratio of the major internal dimension to the minor internal dimension is between 2 and 5 although ratios from 1.5 to 10.0 may be used in some instances. Thus by employing the flattened tubes as indicated in Figures 3 and 5 and by placing the major axis perpendicular to the direction of motion, a minimum displacement is permitted.

With this minimum tube dimension aligned in the direction of tray movement, the minimum permissible stroke ($S_m$) while prohibiting leakage of solids through the feeder is equal to twice the minimum dimension of the tubes ($2d$) plus an overlap which is equal to 1.5 times the clearance ($c$), and may be expressed by:

$$S_m = 2d + 1.5c$$

Preferably the stroke employed is between this minimum distance and a distance equal to ¼ of the diameter of the conduit in which the feeding device of this invention is employed. Thus with a clearance of 0.25 inch and a minimum tube dimension of 2.0 inches, the minimum stroke obtained is 4.375 inches. With a hanger length of 30 inches and the foregoing minimum stroke the change in clearance in the swing type feeder is of the order of 0.07 inch. Preferably this change in clearance is calculated prior to construction and the intermediate tray is positioned so that the change increases the clearance from the minimum values given above. In the handling of granular charcoal as in the adsorption process described in connection with Figure 1, this change in clearance is insufficient to adversely affect the excellent attrition characteristics of the feeding device.

A specific example of the solids feeder mechanism designed for a capacity of 5.86 cubic feet of granular solids per minute is given below. The upper stationary tray consists of nine 9-inch channel iron trays provided with a total of 58 tubes 18 inches in length. The diameter of the upper tray is 9 feet 3 inches. The movable tray has substantially 80% the diameter of the upper tray and is constructed of 8-inch channels provided with 58 tubes. These tubes have a major diameter of 4.6225 inches and a minor diameter of 1.56 inch. They are prepared by flattening a 4.5-inch O. D. 11 gauge seamless steel tube, the length of the tubes depending from the movable tray is 12 inches and a flow rate of 5.86 cubic feet per minute is attained at 10.65 cycles per minute. Employed in a selective adsorption column 9 feet 3 inches inside diameter this feeding device maintained a flow rate through the column of 93,750 lbs./hr. of granular adsorbent charcoal having a mesh size of 10–30. The pressure drop between points above and below the feeding device is negligible due to the fact that about 25 vent holes were drilled in the lower stationary plate and 48 risers and caps are situated on the upper stationary tray. The suspension of the movable tray was by means of 20-inch hangers provided with lubricated spherical bearings at each end, 4 hangers being provided.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for metering the volumetric flow of granular solids through a system which comprises a conduit of substantially constant cross-sectional area through which uniform solids flow is desired, an upper stationary tray peripherally supported from the inner walls of said conduit, a plurality of feeder tubes arranged with their inlets opening through and dependent from said upper stationary tray in a regular geometric pattern, a plurality of gas riser tubes supported on said upper stationary tray provided with caps and dispersed uniformly among the inlet openings of said feeder tubes thereon, a lower stationary tray peripherally supported at the inner walls of said conduit in a position below and parallel to said upper stationary tray and provided with a plurality of openings for gas and openings for solids flow therethrough distributed uniformly over its area, an intermediate reciprocable tray supported between said upper and lower stationary trays and parallel thereto, a plurality of charge tubes arranged in a regular geometric pattern on and dependent from said reciprocable tray, a free annular space for gas flow around said reciprocable tray being provided, and motive means for transversely reciprocating said reciprocable tray connected thereto to bring said charge tubes alternately into alignment with said feeder tubes to receive a charge of solids therefrom and subsequently into alignment with the openings of said lower stationary tray to discharge solids therethrough.

2. An apparatus for metering the volumetric flow of granular solids through a system which comprises a conduit of substantially constant cross-sectional area through which uniform solids flow is desired, an upper stationary tray peripherally supported from the inner walls of said conduit, a plurality of feeder tubes arranged with their inlets opening through and dependent from said upper stationary tray in a regular geometric pattern, said feeder tubes converging downwardly having their outlet openings arranged in a similar geometric pattern which is between 50% and 98% the size of said pattern of inlet openings, a plurality of gas riser tubes supported on said upper stationary tray provided with caps and dispersed uniformly among the inlet openings of said feeder tubes thereon, a lower stationary tray peripherally supported from the inner walls of said conduit in a position below and parallel to said upper stationary tray and provided with a plurality of openings for gas and openings for solids flow therethrough distributed uniformly over its area, an intermediate reciprocable tray supported between said upper and lower stationary trays and parallel thereto, a plurality of charge tubes arranged in a regular geometric pattern on and dependent from said reciprocable tray, an annular free space for gas flow around said reciprocable tray being provided, and motive means for transversely reciprocating said reciprocable tray connected thereto to bring said charge tubes alternately into alignment with said feeder tubes to receive a charge of solids therefrom and subsequently into alignment with the openings of said lower stationary tray to discharge solids therethrough.

3. An apparatus for metering the volumetric flow of granular solids through a system which comprises a conduit of substantially constant cross-sectional area through which uniform solids flow is desired, an upper stationary tray peripherally supported from the inner walls of said conduit, a plurality of feeder tubes arranged with their inlets opening through and dependent from said upper stationary tray in a regular geometric pattern, said inlet openings being uniformly distributed throughout the entire upper stationary tray to draw solids uniformly from the entire cross-sectional area of said conduit, said feeder tubes converging downwardly and having their outlet openings at a position of from 2% to 50% decreased general radial displacement from the position of their corresponding inlet openings measured from an axis running perpendicularly through the center of said upper stationary tray, a plurality of gas riser tubes supported on said upper stationary tray provided with caps and dispersed uniformly among the inlet openings of said feeder tubes thereon, a lower stationary tray peripherally supported from the inner walls of said conduit in a position below and parallel to said upper stationary tray and provided with a plurality of openings for gas and solids flow therethrough distributed uniformly over its area, an intermediate tray reciprocably supported between said upper and lower stationary trays and parallel thereto, a plurality of charge tubes arranged in a regular geometric pattern on and dependent from the reciprocable tray, an annular free space for gas flow between the periphery of said reciprocable tray and the inner wall of said conduit being provided, and motive means for transversely reciprocating said reciprocable tray connected thereto to bring said charge tubes alternately into alignment with said feeder tubes to receive a charge of solids therefrom and subsequently into alignment with the openings of said lower stationary tray to discharge solids therethrough.

4. An apparatus for metering the volumetric flow of granular solids through a system which comprises a conduit of substantially constant cross-sectional area through which said solids flow, an upper stationary tray peripherally supported at the walls of said conduit, a plurality of feeder tubes arranged with their inlets in a regular geometric pattern opening through and dependent from said upper stationary tray, said inlet openings being uniformly distributed throughout the entire upper stationary tray area to draw solids uniformly from the entire cross-sectional area of said conduit, said feeder tubes converging downwardly and having their outlet openings at a position of from 2% to 50% decreased general radial displacement from the corresponding inlet openings measured from an axis running perpendicularly through the center of said upper stationary tray, a plurality of gas riser tubes supported on said upper stationary tray provided with caps and dispersed uniformly throughout the area thereof among the inlet openings of said feeder tubes thereon, a lower stationary tray peripherally supported at the walls of said conduit in a position below and parallel to said upper stationary tray and provided with a plurality of openings for gas and solids flow therethrough distributed uniformly over its area, an intermediate reciprocable tray supported between said upper and lower stationary trays and parallel thereto, a plurality of charge tubes arranged in a regular geometric pattern on and dependent from said reciprocable tray, the minimum clearance between the lower openings of said feeder tubes and said reciprocable tray and between the lower openings of said charge tubes and said lower stationary tray being at least 1.5 times and preferably from 2 to 5 times the average diameter of the solids handled, free space for gas flow around said reciprocable tray being provided, and motive means for transversely reciprocating said reciprocable tray connected thereto to bring said charge tubes alternately into alignment with said feeder tubes to receive a charge of solids therefrom and subsequently into alignment with the openings of said lower stationary tray to discharge solids therethrough, said apparatus thereby providing a low resistance path therethrough for fluids which is substantially independent of the path for solids.

5. An apparatus according to claim 4 wherein the stroke of said reciprocable tray is at least equal to twice the feeder tube diameter in the direction of reciprocation plus 1.5 times said clearance and less than ¼ of the diameter of said conduit.

6. An apparatus according to claim 4 wherein said feeder and charge tubes are of flattened semi-elliptical cross-section having a ratio of major to minor diameter of between 1.5 and 10 and wherein the minor diameter is at least 5 times the average diameter of the particles being metered.

7. An apparatus according to claim 4 in combination with at least two tracks disposed parallel to the direction of movement and below said reciprocable tray and between the rows of charge tubes depended therefrom, said tracks being attached to the walls of said conduit at their ends, at least two carriages in sliding contact with each of said tracks, said reciprocable tray being supported on said carriages.

8. An apparatus according to claim 4 in combination with at least 3 hangers disposed substantially vertically between said upper stationary and said reciprocable tray, each of said hangers pivotably attached at its upper end to said upper stationary tray and at its lower end to said reciprocable tray.

9. An apparatus according to claim 4 wherein said upper stationary and said reciprocable trays are fabricated from a plurality of lengths of channel iron laid side by side with flanges down and with their longitudinal axis parallel to the direction of reciprocable tray movement, said upper stationary tray being further provided along the center line of each channel with a row of alternate dependent downwardly converging feeder tubes and gas risers with caps above said channel, said reciprocable tray being provided with a row of dependent charge tubes along the center line of each channel thereof, and wherein the width of each channel iron of said reciprocable tray is between 2% and 50% less than the width of the corresponding channel iron of said upper stationary tray.

10. An apparatus for metering the flow of granular solids through a system which comprises a conduit of substantially uniform cross-sectional area through which the solids flow, an upper stationary tray comprising a plurality of channel iron beams laid side by side with flanges down and peripherally supported from the inner walls of, and filling the entire cross-sectional area of said conduit, a plurality of feeder tubes in rows dependent from each channel beam in said upper stationary tray with their inlets opening therethrough, said feeder tubes being arranged in rows and distributed in a regular geometric pattern throughout the area of said upper stationary tray, said feeder tubes converging below said tray and having their outlet openings arranged in a reduced scale similar geometric pattern, a free path for fluid flow through said tray in either direction comprising a plurality of tubular risers opening through said upper stationary tray and covered at their upper open end with caps, said risers being placed between each pair of upper openings of said feeder tubes in said rows thereof on said upper stationary tray, a lower stationary tray peripherally supported from the inner walls of said conduit in a position below and parallel to said upper stationary tray and provided with a plurality of openings for gas and solids flow therethrough distributed uniformly over its area, an intermediate reciprocable tray comprising a plurality of channel iron beams laid side by side with flanges down and supported between said upper and lower stationary trays and parallel thereto, said channel iron beams being supported with axes parallel to those of the beams of said upper stationary tray and having widths and lengths between 2% and 50% less than those of the beams of said upper tray thereby providing an annular free path around said reciprocable tray for free flow of fluid, a plurality of charge tubes dependent in rows from and opening through said reciprocable tray along the center line of each channel thereof in a regular geometric pattern of substantially the same magnitude as that of the lower openings of said feeder tubes, the clearance between the lower ends of said feeder tubes and said reciprocable tray and between the lower ends of said charge tubes and said lower stationary tray being between 2 and 5 times the average solid particle diameter, said reciprocable tray provided with a driving means for continuously reciprocating said tray in a plane substantially parallel to said stationary trays with a stroke equal to at least twice the feeder tube dimension in the direction of reciprocation plus 1.5 times said clearance and not more than ¼ the diameter of said conduit, the outlet openings of said feeder tubes being positioned with respect to the inlet openings of said charge tubes and the outlet openings of said charge tubes being positioned with respect to the openings in said lower stationary tray so that upon reciprocation of said reciprocable tray each charge tube is alternately aligned with a feeder tube while misaligned with all openings in said lower stationary tray and subsequently is aligned with such an opening while the lower openings of said feeder tube are sealed by misalignment with the charge tubes.

11. An apparatus according to claim 10 wherein at least part of said charge tubes are aligned with at least part of said feeder tubes at one extreme position of said reciprocable tray to receive solids therefrom and subsequently aligned with openings in said lower stationary tray to discharge solids therethrough at the other extreme position.

12. An apparatus according to claim 11 wherein at one extreme position of the reciprocable tray charge tubes in alternate rows are aligned with feeder tubes in their corresponding rows thereof to receive solids while the other charge tubes are aligned with lower stationary tray openings to discharge solids therethrough and at the other extreme position the charge tubes in the other rows are aligned with feeder tubes in their corresponding rows thereof to receive solids while charge tubes in the alternate rows are aligned with lower stationary tray openings to discharge solids.

13. An apparatus according to claim 10 wherein at least some of the charge tubes are filled with the reciprocable tray at a central position in its stroke and discharged when the reciprocable tray is moved to either of its extreme positions.

14. An apparatus according to claim 10 wherein at least some of the charge tubes are filled at either extreme position of the reciprocable tray and discharged at its central position.

15. An apparatus according to claim 10 in combination with a flat screen positioned parallel to and below said lower stationary tray and having mesh openings of at least 5 times the average particle diameter.

16. An apparatus according to claim 10 wherein said majority of feeder tubes depending in rows from said upper stationary tray are of uniform flattened elliptical cross-section, in combination with a number of "fractional" feeder tubes dependent from said upper stationary tray at the ends of said rows of feeder tubes adjacent the periphery of said tray, said fractional tubes being a flattened elliptical tube split longitudinally and provided with a flat side forming a feeder tube of cross-sectional area reduced from that of the major portion of feeder tubes.

17. An apparatus according to claim 10 wherein said feeder and charge tubes are of flattened elliptical cross-section having a major to minor transverse dimension ratio of between 1.25 and 10, the minor dimension being at least 5 times the average diameter of solid particles being handled and wherein said tubes are disposed in said rows with their minor transverse axes parallel to the direction of reciprocable tray motion.

18. In an apparatus for contacting a fluid with a moving bed of granular solids which comprises a vertical column, an inlet conduit for granular solids into the top thereof, an inlet conduit opening thereinto for fluids to be contacted, an outlet conduit for contacted fluids from said column and means for conveying at least part of the solids removed from the bottom of said column to the top thereof for contacting further quantities of said fluids, the combination therewith of a solids flow distribution device situated adjacent the bottom of said column adapted to uniform withdrawal of solids from said column throughout the entire cross-sectional area thereof while unaffected by fluid flow in either direction, which device comprises an upper stationary tray comprising a plurality of channel iron beams laid side by side with flanges down and peripherally supported from the inner walls of, and filling the entire cross-sectional area of said column, a plurality of feeder tubes in rows dependent from each channel beam in said upper stationary tray with their inlets opening therethrough, said feeder tubes being arranged in rows and distributed in a regular geometric pattern throughout the area of said upper stationary tray, said feeder tubes converging below said tray and having their outlet openings arranged in a reduced scale similar geometric pattern, a free path for fluid flow through said tray in either direction comprising a plurality of tubular risers opening through said upper stationary tray and covered at their upper open end with caps, said risers being placed between each pair of upper openings of said feeder tubes in said rows thereof on said upper stationary tray, a lower stationary tray peripherally supported from the inner walls of said column in a position below and parallel to said upper stationary tray and provided with a plurality of openings for gas and solids flow therethrough distributed uniformly over its area, an intermediate reciprocable tray comprising a plurality of channel iron beams laid side by side with flanges down and supported between said upper and lower stationary trays and parallel thereto, said channel iron beams being supported with axes parallel to those of the beams of said upper stationary tray and having widths and lengths between 2% and 50% less than those of the beams of said upper tray thereby providing an annular free path around said reciprocable tray, a plurality of charge tubes dependent in rows from and opening through said reciprocable tray along the center line of each channel thereof in a regular geometric pattern of substantially the same magnitude as that of the lower openings of said feeder tubes, the clearance between the lower ends of said feeder tubes and said reciprocable tray and between the lower ends of said charge tubes and said lower stationary tray being between 2 and 5 times the average solid particle diameter, said reciprocable tray provided with a driving means for continuously reciprocating said tray in a plane substantially parallel to said stationary trays with a stroke equal to at least twice the feeder tube dimension in the direction of reciprocation plus 1.5 times said clearance and not more than ¼ the diameter of said conduit, the outlet openings of said feeder tubes being positioned with respect to the inlet openings of said charge tubes and the outlet openings of said charge tubes being positioned with respect to the openings in said lower stationary tray so that upon reciprocation of said reciprocable tray each charge tube is alternately aligned with a feeder tube while misaligned with all openings in said lower stationary tray and subsequently is aligned with such an opening while the lower openings of said feeder tube are sealed by misalignment with the charge tubes.

19. An apparatus according to claim 18 wherein said column is a selective adsorption column provided at successively lower levels therein with a tubular cooling section, an unadsorbed gas disengaging section, an adsorption section, a feed gas engaging section, at least one rectification section, a desorbed gas product disengaging section, a tubular heating section for adsorbent and provided with means for passing a stripping gas therethrough, said solids flow distribution device and an outlet conduit disposed below said device for removal of at least part of said stripping gas.

20. An apparatus according to claim 19 wherein a stripping gas engaging section for introducing said stripping gas is disposed below said device and at least part of the stripping gas introduced thereby passes upwardly through said device and is removed from said desorbed gas disengaging section.

CLYDE H. O. BERG.

References Cited in the file of this patent

UNITED STATES PATENTS

| Number | Name | Date |
|---|---|---|
| 2,544,214 | Berg | Mar. 6, 1951 |